E0152 XR 3,713,027

Jan. 23, 1973 B. T. SETCHELL 3,713,027

TELEVISION ANTENNA MULTIPLE LEAD-IN SYSTEMS

Filed Nov. 12, 1969 2 Sheets-Sheet 1

INVENTOR
BARTON T. SETCHELL
BY Robert M. Dunning
ATTORNEY

INVENTOR
BARTON T. SETCHELL
BY Robert Wm. Dunning
ATTORNEY

United States Patent Office 3,713,027

Patented Jan. 23, 1973

3,713,027

TELEVISION ANTENNA MULTIPLE LEAD-IN SYSTEMS

Barton T. Setchell, 2505 S. Ocean Blvd., Palm Beach, Fla. 33480

Filed Nov. 12, 1969, Ser. No. 875,831
Int. Cl. H04b *1/06*
U.S. Cl. 325—308 4 Claims

ABSTRACT OF THE DISCLOSURE

Television antennas used on hotels, motels, apartment houses and the like are normally connected to a considerable number of television sets, usually resulting in a great reduction in the RF signal delivered to each set. To prevent this difficulty, a low DC voltage is applied to the incoming trunk line from the antenna. This low D.C. voltage is used to control a transistor at each television outlet. The transistor functions to deliver an amplified RF signal to a RF transformer, the secondary of which is connected to the television antenna terminals. Virtually no signal loss is experienced at each outlet, and each set is isolated from the others on the same trunk line by the transistor circuit.

This invention relates to an improvement in television antenna multiple lead-in systems and deals particularly with a means of distributing the signal received by the television antenna to a considerable number of television receiving sets in a manner to provide adequate reception at each of the sets.

BACKGROUND OF THE INVENTION

Hotels, motels, and apartment houses having a considerable number of separate apartments are usually provided with a single receiving antenna. In the past, it has been common practice to connect a 75 ohm trunk line to the antena, where necessary, and to use what may be commonly termed as splitters to divide the incoming signal into a plurality of lines connecting the splitter with terminals in each room or apartment to which the television sets may be connected. These splitters greatly reduce the input signal to the individual receiving sets. As an example, if the antenna is connected to a single splitter dividing the incoming signal into two separate auxiliary trunk lines, each auxiliary trunk line receives somewhat less than than one half of the original signal strength. If, such as in the case of an 8 story building, signal splitters are used to connect the main trunk line with 8 auxiliary trunk lines, the amplitude of the signal in each of these eight lines amounts to approximately one tenth of the incoming signal, thus, greatly reducing the signal strength at each individual receiving set.

The receiving sets connected to such systems are also susceptible to variation depending upon the number of receiving sets in any auxiliary trunk line which are turned on at a particular time. Considering, for example, that there are fifteen television receiving sets plugged into an auxiliary trunk line which is connected through a splitter to the main trunk line connected to the antenna, the quality of the picture received in a set near the end of the auxiliary trunk line may vary each time another receiving set in the same auxiliary trunk line is turned on or off. The variation may result in a difference in color, or in some other quality of the picture, so that a receiving set connected in such a location may require frequent adjustment if a good quality picture is to be obtained, and if it is available at this point.

While black and white television sets are relatively simple to control, and require a less critical incoming signal to function properly, color television sets require a much more accurate and intensive incoming signal. Thus, while previous forms of signal splitting or dividing devices have often been adequate to provide the necessary incoming signal for black and white television sets, the same system will not function properly to produce the necessary signal for a color television set.

Quite another problem is involved where the antenna system is installed near a television broadcasting tower. Where the antenna system is generally equidistant from a number of television broadcasting towers, it is possible to provide an amplifier connected to the main trunk line leading from the antenna to amplify the signal so that when the intensity of the signal is reduced by splitters, the signal will still be adequate at the ends of the auxiliary trunk lines. However, when the antenna system is installed close to one television broadcasting tower in an area where the signal from that station greatly overpowers that from any other, an amplifier is of little value unless the signal from the nearby station is attenuated to bring its signal strength into a range of signal reception from other stations. Even in this case, such amplifiers are not only costly to install, but also require maintenance from time to time. In any event, such an arrangement merely amplifies the incoming signal so that the losses which must occur in the trunk line and auxiliary trunk lines may be held to a level where the receiving sets connected to the auxiliary trunk lines will receive an adequate signal. In some cases this is virtually impossible.

SUMMARY OF THE INVENTION

The present invention resides in the provision of an antenna system in which a great number of individual television receiving sets may be attached to a single antenna, and in which the signal available for each set virtually equals the signal at the antenna. It is also an object of the present invention to provide a system of the type described in which each television set is isolated from the others so that no perceptible change is noted in a receiving set near the end of a trunk line regardless of whether one or many receiving sets are turned on or off in the same trunk line.

It is an object of the present invention to provide a means of imparting a direct voltage to the main trunk or transmission line which may be connected to the television receiving sets through suitable terminal boxes. In general, the voltage applied to the trunk line serves to drive a transistor located at each terminal box through which the incoming signal may pass. The transistor is connected to an RF transformer or balun which in turn supplies a balanced 300 ohm output connected to the receiver set. The output of the balun is balanced and floating so that neither side of the 300 ohm antenna lead is at radio frequency ground potential.

Where only a limited number of television receiving sets are connected to the trunk line (as for example up to 80 such sets) the direct current voltage supplied to the trunk line serves to actuate a circuit or electronic system at each terminal box, including a transistor, suitable resistors and condensers, and a balun, the primary of which receives the radio frequency signal and the secondary of which transmits it to a 300 ohm balanced output connected to the television receiving set.

A further feature of the present invention resides in the fact that when the incoming signal is to be transmitted to two or more auxiliary trunk lines, the signal, together with the direct current voltage, is supplied to a novel type of splitter. This splitter actually comprises a splitter-multiplier or, in one sense of the word, a splitter amplifier which includes a transistor driven by the direct current in the antenna line. The incoming signal is amplified or multiplied by the direct current so that the incoming signal may be directed to a plurality of auxiliary trunk lines with virtually no reduction in signal power. In other words, the applicant's splitter-multiplier does not divide the incoming signal into a plurality of auxiliary trunk lines at a greatly reduced amplitude, but actually delivers the incoming signal to the auxiliary trunk lines with no loss of signal power.

An additional feature of the present invention resides in the provision of an outlet device for each individual television receiving set. This device may comprise a terminal plate which is suitable for accommodation on a junction box of conventional form. The terminal plate includes a transistor which is driven by the power supplied by the power supply unit. When the transistor is energized, it acts to feed the incoming signal to a balun which provides a 300 ohm circuit to the television receiving sets. The transistor at each outlet not only provides a signal which is amplified due to the voltage in the trunk line, but also prevents a feed back to the antenna line which would interfere with the signal at any other television receiving set connected to the trunk line or auxiliary trunk line. In other words, a signal which approximates the original signal received by the television antenna is delivered to each television set and as a result, color television sets which are connected at each receiving set may function individually, and without interfering with the reception at any of the other receiving sets connected to the same trunk line or auxiliary trunk line.

A feature of the present invention lies in the provision of a system which comprises a new approach to distributing television antenna signals to a virtually unlimited number of outlets. It features no loss outlets and no loss splitters. The system will accommodate the use of RF–59 or the larger dielectric low loss coaxial cable.

The transistor equipped outlet circuit requires very little power from the 75 ohm trunk line. The balun produces a balanced 300 ohm output (neither side at ground potential). Balanced antenna signal is important because most television receivers use 300 ohm twin antenna lead which terminates into a balun having its center tap grounded. This means that if either side of the 300 ohm antenna lead is at ground potential there will be an RF shunt loop which can cause poor picture, bad color, and the like.

Where a balun is connected directly to a 75 ohm trunk line for low loss take off, the result is poor isolation from one television receiver to others, as well as excessive trunk line loading, peaking, trapping etc. To minimize this problem, resistors and/or capacitors have been used which result in signal loss. More isolation has normally meant more signal loss.

The present system results in extremely good isolation with a minimum of 25 db. It employs very low line load with a feed through loss a maximum of 0.3 db; Conversion of the 75 ohm unbalanced signal to a balanced 300 ohm signal is accomplished with no loss. Furthermore, more gain or attenuation is available by changing the value of one resistor in the circuit.

The power supply is connected between the antenna and the trunk line leading to the outlets, or splitter-multiplier. In the arrangement shown 117 volt AC 60 cycle current will furnish enough DC power (6.5 to 9.0 volts) to handle up to eighty outlets plus twelve splitter-multipliers. Eighty outlets at 3 ma. equals 240 ma. Twelve splitter-multipliers at 5 ma. equal 60 ma., or a total of 300 ma.

These and other objects, and novel features of the present invention, will be more clearly and fully set forth in the following specification and claims.

DESCRIPTION OF THE PREFERRED MODIFICATIONS

Figures 1, 2, 3:
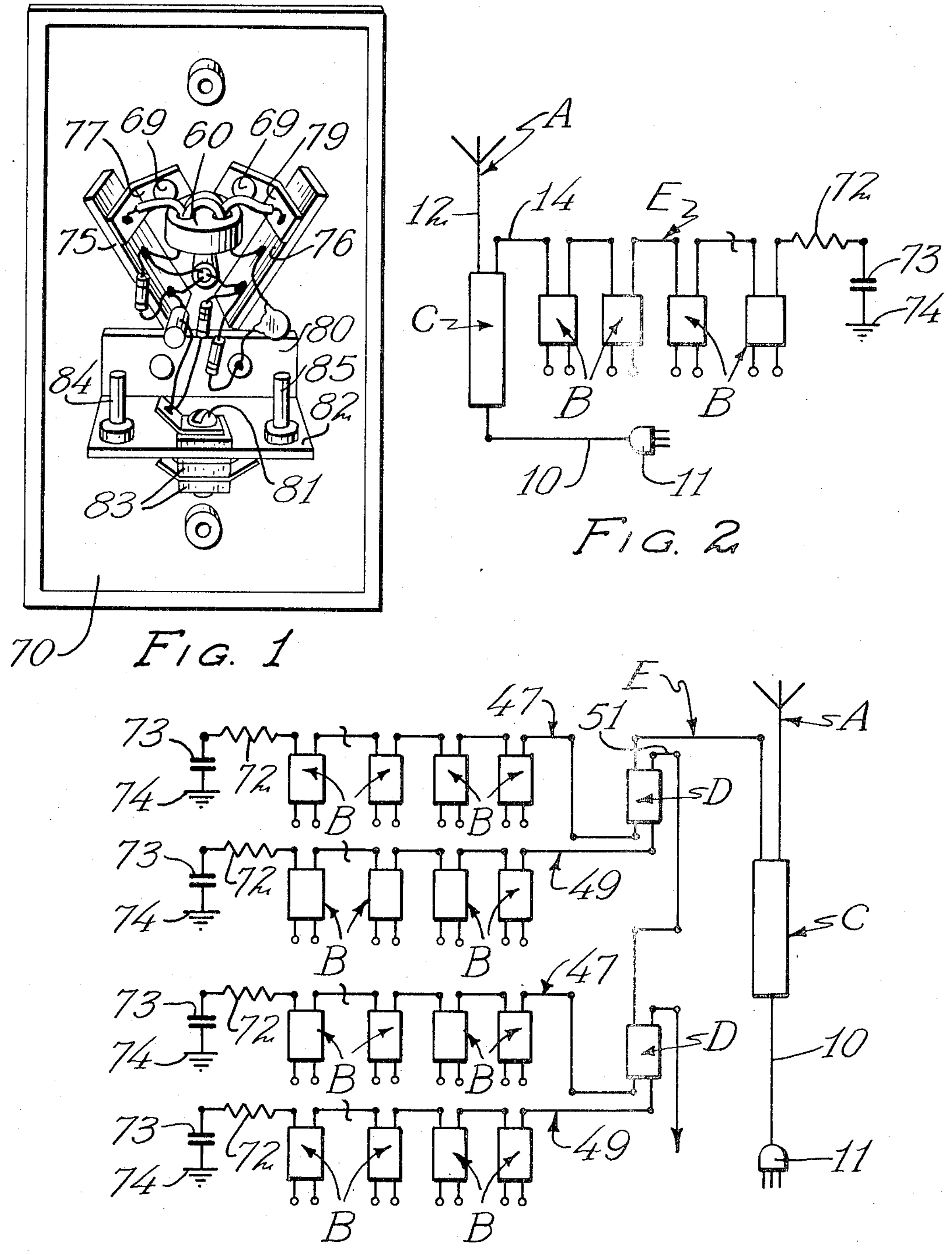
FIG. 1 is a rear perspective view of a mounting plate designed for use in a terminal box of ordinary construction showing the general arrangement of parts therein.
FIG. 2 is a diagrammatic view of the system which includes an antenna, a means of supplying direct current to the trunk line from the antenna, and a series of television terminal boxes providing outlets connected thereto.
FIG. 3 is a view similar to FIG. 2, but showing a pair of splitter-multipliers of the type designed to direct the incoming signal to four auxiliary trunk lines.

FIG. 2 of the drawings discloses the simpliest form of construction which may, under proper circumstances, be used for connecting a single antenna, indicated in general by the letter A, to terminal box outlets which are indicated in general by the letter B. As is indicated diagrammatically, the antenna A is connected to a power supply unit C connected by a conductor 10 to a source of AC power through a plug 11. The arrangement is such that the plug 11 may be plugged into any ordinary house circuit, such as a 117 volt 60 cycle supply line.

Figure 4:
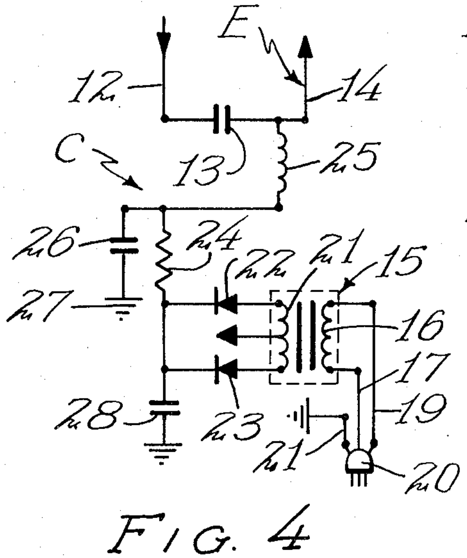
FIG. 4 is a diagrammatic view of the power supply designed to impose a direct current voltage upon the antenna trunk line.

The power supply C is best indicated in FIG. 4 of the drawings. The numeral 12 indicates the conventional coaxial cable, one conductor of which is grounded, the other cable conductor leads from the antenna A to a .001 condenser 13 connected to the output 14. A transformer 15 has its primary coil 16 connected by conductors 17 and 19 to a plug 20 which is designed for connection with a suitable source of power such as 110 to 120 volt AC current. The third terminal of the plug 20 may be grounded as is usual practice for safety purposes.

The ends of the secondary coil 21 of the transformer 15 is connected through rectifiers 22 and 23 to a 10 ohm 7 watt resistor 24. The center tap of the secondary 21 is grounded. DC current passing through the resistor 24 passes through a radio frequency choke 25 to the output conductor 14 leading to the trunk line E. The output of the rectifiers 22 and 23 are by-passed to ground by the 4K mf. condenser 28. The purpose of this device is to supply direct current voltage to the trunk line 14. The maximum current is limited by the 10 ohm 7 watt resistor to protect the power supply in case of line short circuits. The system is also protected by the .001 condenser 26, which is connected to the output of the resistor 24 and which leads to ground as indicated at 27. The power supply unit is RF isolated from the antenna trunk line by the radio frequency choke 25. At the same time, the system supplies a DC voltage to the transmission trunk line E depending upon the value of the resistor 24. The device illustrated in FIG. 4 of the drawings supplies direct current to the incoming line from the antenna A, to the transistors in splitter-multiplier units and in the individual television set terminal boxes, as will be later described. In practice, the voltage may vary, but is maintained at a low level, such as, for example, 6.5 to 9 volts D.C.

The splitter-multiplier is indicated in general by the letter D, and may be connected to the main trunk line E which has been identified by the numeral 14 in FIG. 4 of the drawings.

Figure 5:
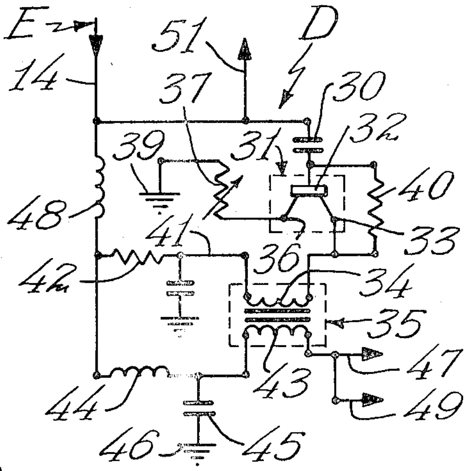
FIG. 5 is a diagrammatic view of a splitter which may be used to divide the incoming signal to a pair of auxiliary trunk lines.

As is indicated in FIG. 5 of the drawings, the main trunk line E, one terminal of which is grounded to the chassis of the device, is connected through a 47 pf. condenser 30 to the base 32 of a transistor 31 to transmit the RF from the broadcast channels thereto. The collector terminal 33 of the transistor 31 is connected to the primary coil 34 of the RF transformer or balun 35. The emitter 36 of the transistor 31 is connected by the 300 ohm resistor 37 to ground as indicated at 39. The resistor 37 is used as a variable degenerative or gain control at the emitter terminal 36. A 100,000 ohm resistor 40 furnishes bias voltage to the base of the transistor.

The other terminal of the balun primary 34 is connected by a conductor 41 to a positive potential through the 470 ohm isolating the protective resistor 42 and the radio frequency choke 43. As a result, the energization of the transistor 31 serves to provide amplified current to the primary 34 of the balun 35 so that the incoming signal will be transmitted to the balun primary 34.

One terminal of the secondary coil 43 of the balun 35 is connected through the radio frequency choke 44 to the radio frequency choke 43. This terminal of the secondary of the balun coil 43 is also connected through the .001 condenser 45 to ground as indicated at 46. The other terminal of the balun secondary is connected to auxiliary trunk lines 47 and 49. As a result the signal is transmitted to auxiliary trunk lines. The DC voltage is carried through from the incoming line to the auxiliary trunk lines through the RF chokes 43 and 44.

Figure 6:
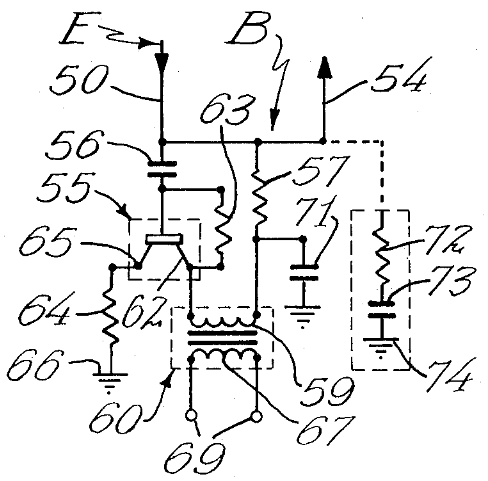
FIG. 6 is a diagrammatic view of the circuitry of each individual television terminal box outlet connected to either the main trunk line or an auxiliary trunk line.

The units B which are used to transmit the incoming RF signal either from the trunk line E or from the auxiliary trunk lines 47 and 49 to the television set are connected to the input 50 of the device shown in FIG. 6 of the drawings. The output terminal 51 of the splitter-multiplier D may extend to similar splitter-multipliers and down the line, as is indicated in FIG. 3 of the drawings. With reference to FIG. 6 of the drawings, the member assembly B includes the inlet 50 and outlet 54 which are connected to form a part of or a continuation of the trunk line E or the auxiliary trunk line 47 or 49. The incoming signal reaches the transistor 55 through the 7 pf. condenser 56 connected to the base of the transistor 55.

The incoming RF signal from the trunk line or auxiliary trunk line is connected through the 1500 ohm resistor 57 to one terminal of the primary coil 59 of the balun 60. The other primary coil terminal is connected to the collector terminal 62 of the transistor 55. A 100K resistor 63 furnishes bias voltage to the transistor base. A 150 ohm resistor 64 provides the desired output and is connected between the emitter terminal 65 and ground as indicated at 66.

The resistor 64 is capable of providing more gain or attenuation if desired. A value of 150 ohms was selected to provide 0 db for low channels and 0 to +3 db for high channels. For more gain, the value of resistor 64 may be reduced. For more attenuation and higher signal handling ability, the value of the resistor 64 may be increased.

The secondary 67 of the balun 60 is connected to terminals 69 on the terminal plate 70 (see FIG. 1). These terminals are connected to the television receiving set and converts the unbalanced 75 ohm signal to a balanced 300 ohm signal with no loss.

A .001 condenser 71 is connected between the balun primary and ground. The last terminal box outlet in a trunk line or auxiliary trunk line is terminated by a 75 ohm resistor 72 and a .001 capacitor 73, the capacitor being grounded as indicated at 74. The condenser 73 is designed to prevent short circuiting of the DC voltage in the trunk line or auxiliary trunk lines.

FIG. 3 of the drawings diagrammatically illustrates the antenna A, the power supply unit C and a trunk line E similar to that which has been described. Two splitter-multipliers D are provided, the first of which is directly connected to the power supply unit C, and the next of which is connected by a continuation of the main trunk line E for the output terminal 51 of the first splitter-multiplier to the input terminal of the next. The trunk line is shown continuing from the second splitter D to similar splitter-multipliers when it is so desired. As is indicated in FIG. 3, the ends of the auxiliary trunk lines 47 and 49 which are most remote from the splitters D are terminated by the 75 ohm resistor 72 and the isolating condenser 73, the other terminal of which is grounded at 74. While the auxiliary trunk lines have been shown as being connected to only four terminal box outlets or units B, it is obvious that this number can be greatly increased.

FIG. 1 of the drawings shows the manner in which the units B may be supported upon a terminal plate 70 which is formed of non-conductive material, the various elements of the circuit being indicated by the numbers previously used. As indicated, a pair of insulation blocks 75 and 76 are supported by electrically conductive angle brackets 77 and 79 which lead to the output terminals 67 and 69. The terminals 67 and 69 may be electrically conductive bolts or the like extending through the plate 70 and to which the antenna leads from the television receiver may be connected.

An electrically conductive angle 80 is also riveted or otherwise secured to the rear surface of the plate 70. A bolt or similar connector 81 extends through the rearwardly extending flange 82 of the angle member 80 and is insulated therefrom. Attachment nuts 83 are provided to which the input conductor 50 and output conductor 54 are attached. Conductors lead from the upper end of the bolt 81 to the remainder of the circuit which has been described.

Figure 7:
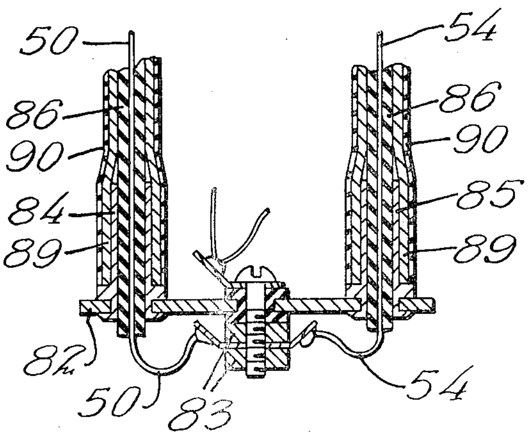
FIG. 7 is a sectional detail in enlarged form showing the manner in which the elements of the terminal box outlet are connected.

FIG. 7 shows a typical manner of connecting the incoming and outgoing cables to the angle bracket 80. A pair of electrically conductive sleeves 84 and 85 are riveted or otherwise secured to the horizontal flange 82 of the bracket 80. The incoming conductor 50 and the outgoing conductor 54 are similarly attached to the sleeves 84 and 85. The conductors 50 and 54 form a part of a coaxial cable, the conductors being enclosed in a tube of insulation 86 which extends through the corresponding sleeves 84 and 85 to terminate beyond the mounting bracket 80 and so that the conductors may be attached to the bolt 81 between the nuts 83. A metal ground sheath 89 encircles the insulation tube 86 and is threaded over the corresponding sleeve for electrical connection therewith. An outer sleeve of insulation 90 encircles the conductive sheath 89.

The terminal plate 70 may be mounted in a junction box of well known form, usually recessed into the wall of a room. The television set is connected to the antenna terminal 67 and 69 in the usual manner to receive the signal therefrom.

The values described for the transistors and the condensers are given as an example. Elements having these values have been used very successfully in actual practice. However, obviously variations from these values may also be employed whenever desired.

I claim:

1. A television antenna multiple lead-in system for connecting a plurality of television sets to a single trunk line from the antenna which trunk line is provided with a source of voltage wherein the improvement comprises: a separate signal isolating terminal outlet plate for each television set incorporating as an integral portion thereof, an isolation transistor with the base thereof connected to the trunk line through a condenser so as to receive the RF signal therefrom, said television set receiving only the isolated RF signal from said transistor;

said terminal outlet plate having a pair of terminals adapted to receive the connection from the television set, said terminals being wired directly to the secondary coil of a RF transformer, the primary coil of said RF transformer being wired on one side to the collector lead of said transistor and on the other side to the signal portion of said trunk line through a resistor to receive voltage therefrom, the emitter terminal of the transistor being connected to ground through a resistor;

said terminal outlet plate further having a conductive bracket with connecting means for the trunk line ground thereon and an insulated terminal post adapted to be connected to said trunk line and said transistor connecting condenser, and a bias voltage resistor between a portion of the circuit having the collector potential and the base terminal of the transistor.

2. The system of claim 1 including a splitter-multiplier connected to said antenna through a portion of said trunk line, said splitter-multiplier including an amplifying means with at least one transistor therein through which the RF signal is transmitted and amplified, an RF transformer having a primary coil connected at one end to said amplifying means and having its other end connected to said trunk line to receive voltage therefrom, said last named RF transformer having a secondary coil having one end connected to said trunk line through an RF choke and having its other end connected to a pair of continuation trunk lines connected to said television outlets to direct an amplified RF signal and supply voltage thereto.

3. The system of claim 2 in which the RF signal passes through a condenser to the base of said transistor in said amplifying means, and from the collector terminal of said transistor in said amplifying means to the last named transformer primary.

4. The system of claim 3 including a bias voltage resistor connected between the collector terminal and base terminal of the transistor in said amplifying means, and in which the emitter terminal of said transistor in said amplifying means is connected through a control resistor to ground.

References Cited

UNITED STATES PATENTS

| | | | |
|---|---|---|---|
| 3,368,031 | 2/1968 | Eisele | 325—308 |
| 3,288,922 | 11/1966 | Walker | 325—31 U X |
| 3,054,858 | 9/1962 | Reid | 325—31 |
| 3,435,358 | 3/1969 | Rheinfelder | 178—6 PD |
| 3,566,275 | 2/1971 | Schenfeld | 178—DIG. 13 |

OTHER REFERENCES

Amplifier Handbook, edited by R. F. Sbea, McGraw-Hill, 1967, pp. 17–9—17–21/17–40—17–49.

ROBERT L. GRIFFIN, Primary Examiner

B. L. LEIBOWITZ, Assistant Examiner

U.S. Cl. X.R.

325—31; 178—DIG. 13